US012580275B2

(12) United States Patent
Jang et al.

(10) Patent No.: US 12,580,275 B2
(45) Date of Patent: Mar. 17, 2026

(54) BATTERY MODULE

(71) Applicant: SK ON CO LTD., Seoul (KR)

(72) Inventors: Ho Sang Jang, Daejeon (KR); Ji Eun Kang, Daejeon (KR); Hae Ryong Jeon, Daejeon (KR); Jung Hwan Park, Daejeon (KR)

(73) Assignee: SK On Co., Ltd., Seoul (KR)

( * ) Notice: Subject to any disclaimer, the term of this patent is extended or adjusted under 35 U.S.C. 154(b) by 850 days.

(21) Appl. No.: 17/890,101

(22) Filed: Aug. 17, 2022

(65) Prior Publication Data

US 2023/0057066 A1 Feb. 23, 2023

(51) Int. Cl.
H01M 50/507 (2021.01)
H01M 10/42 (2006.01)
H01M 10/48 (2006.01)

(52) U.S. Cl.
CPC ..... H01M 50/507 (2021.01); H01M 10/4257 (2013.01); H01M 10/482 (2013.01); H01M 2010/4271 (2013.01)

(58) Field of Classification Search
CPC ................................................. H01M 50/507
See application file for complete search history.

(56) References Cited

U.S. PATENT DOCUMENTS 9,472,797 B2 10/2016 Han et al.
10,763,467 B2 9/2020 Kim et al.
2012/0301747 A1 11/2012 Han et al.

2015/0236386 A1* 8/2015 Yang .................... H01M 10/658
165/104.21
2018/0090735 A1 3/2018 Huff et al.
2019/0334216 A1* 10/2019 Kim ..................... H01M 10/486
2020/0127258 A1* 4/2020 Lim ..................... H01M 50/204
2021/0135179 A1 5/2021 Kang et al.
2022/0127258 A1* 4/2022 Yin .......................... A61P 1/16

FOREIGN PATENT DOCUMENTS

CN 110832692 A 2/2020
CN 112290166 A 1/2021
CN 112787013 A 5/2021
(Continued)

OTHER PUBLICATIONS

GB2606730andTranslation (Year: 2022).*
KR20210053053andTranslation (Year: 2021).*

*Primary Examiner* — Brian R Ohara
(74) *Attorney, Agent, or Firm* — The Webb Law Firm

(57) ABSTRACT

Provided is a battery module. The battery module includes a module case; first and second battery groups disposed inside the module case to be spaced apart from each other, each of the first and second battery groups including a plurality of battery cells; a first bus bar assembly disposed on a first side of the first battery group, the first bus bar assembly including a first bus bar electrically connecting the plurality of battery cells of the first battery group; a second bus bar assembly disposed on a first side of the second battery group, the second bus bar assembly including a second bus bar electrically connecting the plurality of battery cells of the second battery group; and a sensing unit electrically connected to both the first bus bar and the second bus bar and configured to measure states of the plurality of battery cells.

14 Claims, 4 Drawing Sheets

(56)         References Cited

FOREIGN PATENT DOCUMENTS

| KR | 1020130023059 | A  | 3/2013  |
|----|---------------|----|---------|
| KR | 101340010     | B1 | 12/2013 |
| KR | 101722183     | B1 | 3/2017  |
| KR | 1020190069873 | A  | 6/2019  |
| KR | 1020190124022 | A  | 11/2019 |
| KR | 102056365     | B1 | 12/2019 |
| KR | 1020210052999 | A  | 5/2021  |

* cited by examiner

BATTERY MODULE

CROSS REFERENCE TO RELATED APPLICATION

This application claims priority to Korean Patent Application No. 10-2021-0109036 filed Aug. 18, 2021, the disclosure of which is hereby incorporated by reference in its entirety.

BACKGROUND OF THE INVENTION

Field of the Invention

The present disclosure relates to a battery module, and more particularly to a battery module with an improved structure.

Description of Related Art

A battery module generally includes a plurality of battery cells and a battery management system that is electrically connected to the plurality of battery cells and manages or monitors each battery cell.

The battery management system is provided to manage or monitor the battery cells based on information of a sensing unit that senses a voltage or a temperature of the battery cells.

The number of sensing units increases as the number of battery cells increases, and thus the size of the battery module increases. As a result, there was a problem in that an unnecessary space is generated.

(Patent Document 1) KR 10-2056365 B1

SUMMARY OF THE INVENTION

An aspect of the present disclosure provides a battery module with an improved structure.

Another aspect of the present disclosure provides a battery module with a compact structure.

In order to achieve the above-described and other objects and needs, in one aspect of the present disclosure, there is provided a battery module comprising a module case; first and second battery groups disposed inside the module case to be spaced apart from each other, each of the first and second battery groups including a plurality of battery cells; a first bus bar assembly disposed on a first side of the first battery group, the first bus bar assembly including a first bus bar configured to electrically connect the plurality of battery cells of the first battery group; a second bus bar assembly disposed on a first side of the second battery group, the second bus bar assembly including a second bus bar configured to electrically connect the plurality of battery cells of the second battery group; and a sensing unit electrically connected to both the first bus bar and the second bus bar, the sensing unit sensing states of the plurality of battery cells.

According to an aspect of the present disclosure, the present disclosure can provide a battery module with a compact structure.

According to an aspect of the present disclosure, the present disclosure can sense information on battery cells of a plurality of battery groups through one sensing unit.

According to an aspect of the present disclosure, the present disclosure can efficiently configure an inner space of a battery module since a sensing unit can be mounted on a bus bar assembly.

According to an aspect of the present disclosure, the present disclosure can minimize a size of a battery module and implement the compact battery module since a separate case accommodating a sensing unit can be omitted.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

DESCRIPTION OF THE INVENTION

Figure 1:
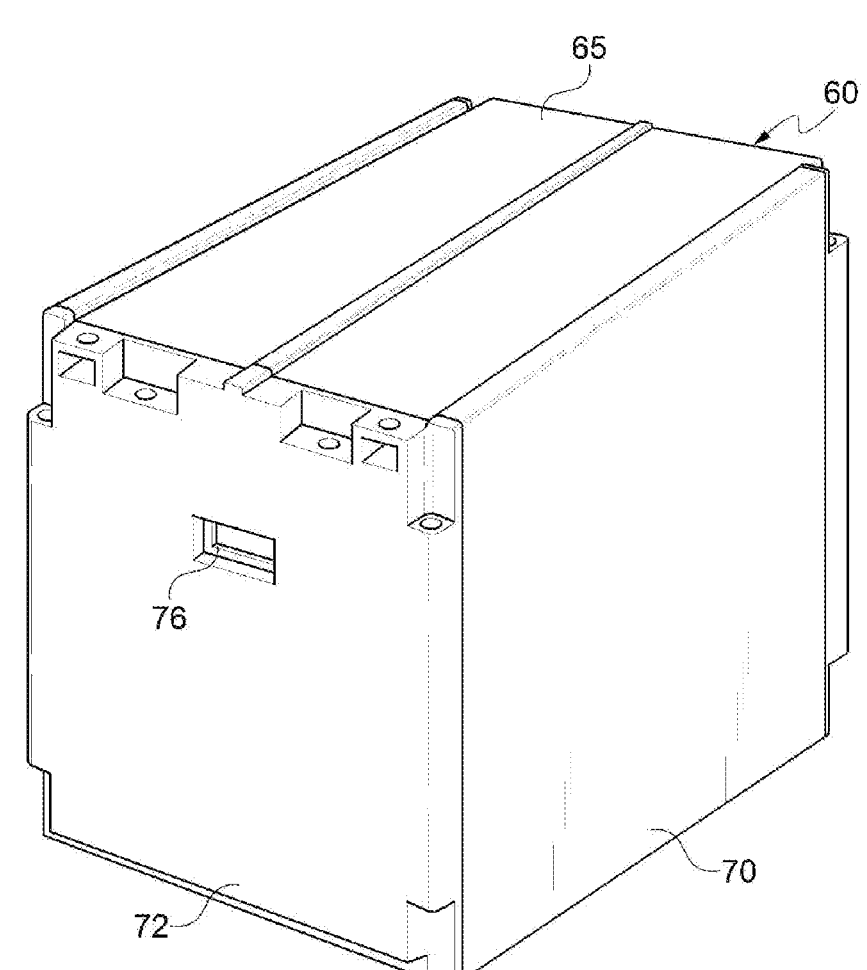
FIG. 1 is a perspective view of a battery module according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function.

It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In addition, term such as "part", "device", "block", "member", and "module" may refer to a unit processing at least one function or operation. For example, the terms may mean at least one hardware such as field-programmable gate array (FPGA)/application specific integrated circuit (ASIC), at least one software stored in a memory, or at least one process processed by a processor.

In the following embodiments, when layers, areas, components, etc. are connected, the following embodiments include both the case where layers, areas, and components are directly connected, and the case where layers, areas, and components are indirectly connected to other layers, areas, and components intervening between them. For example, when layers, areas, components, etc. are electrically connected, the present disclosure includes both the case where layers, areas, and components are directly electrically connected, and the case where layers, areas, and components are indirectly electrically connected to other layers, areas, and components intervening between them.

Reference will now be made in detail to embodiments of the disclosure, examples of which are illustrated in the accompanying drawings. The accompanying drawings illustrate embodiments of the present disclosure and are used to help easily understand various technical features, and it should be understood that embodiments presented herein are not limited by the accompanying drawings.

Figure 2:
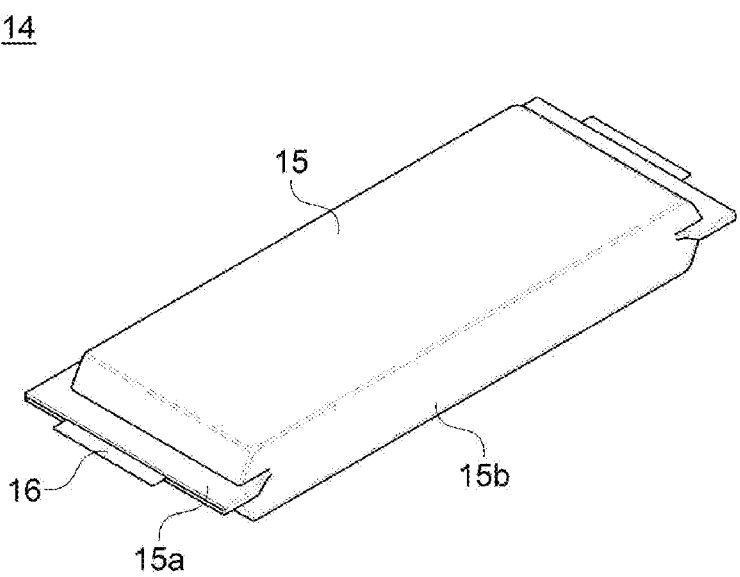
FIG. 2 is a perspective view of a battery cell in a battery module according to an embodiment of the present disclosure.
Figure 3:
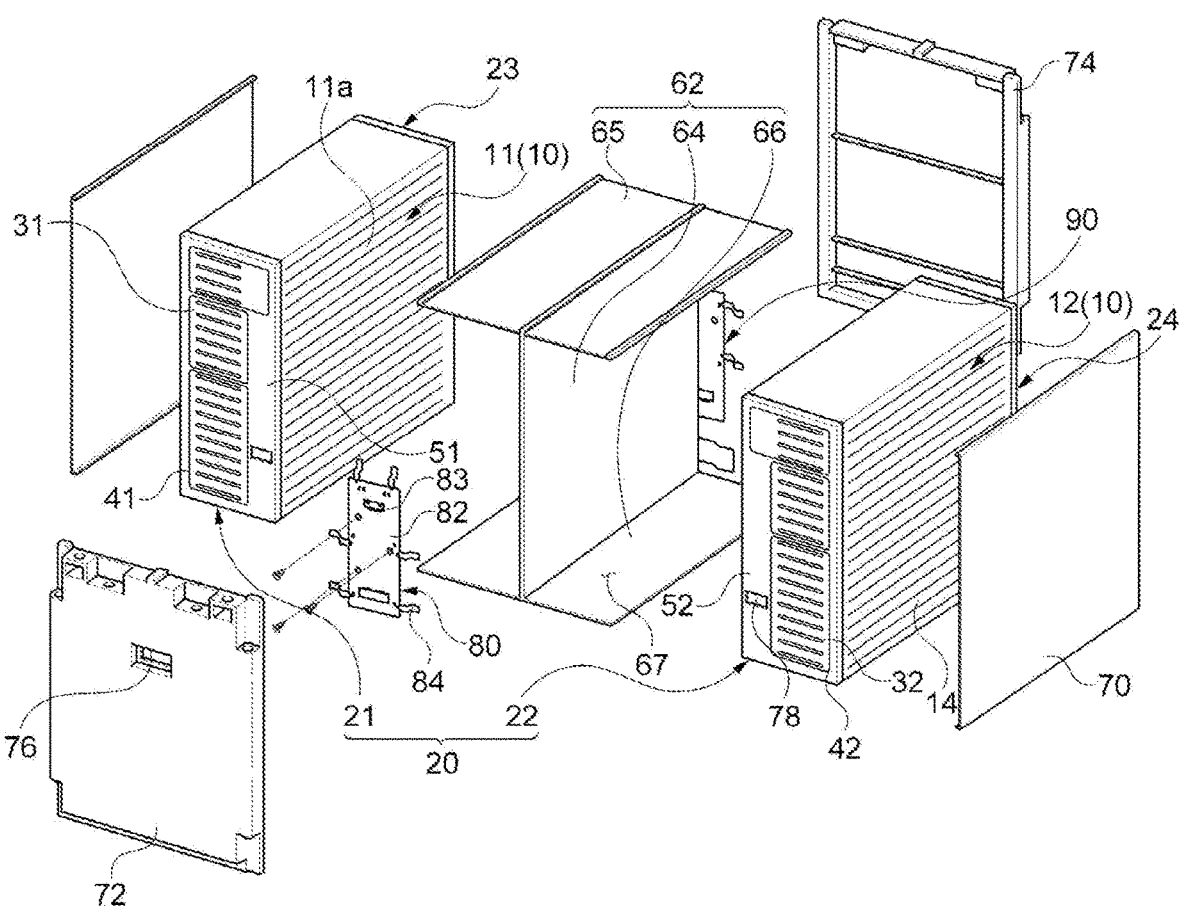
FIG. 3 is an exploded perspective view of a battery module according to an embodiment of the present disclosure.

FIG. 1 is a perspective view of a battery module according to an embodiment of the present disclosure. FIG. 2 is a perspective view of a battery cell in a battery module according to an embodiment of the present disclosure. FIG. 3 is an exploded perspective view of a battery module according to an embodiment of the present disclosure.

A battery module 1 may include a plurality of battery cells 14.

The battery cell 14 may include an electrode assembly (not shown) in which an electrode tab 16 is drawn, and an exterior material 15 accommodating the electrode assembly. That is, the battery cell 14 may include a pouch-type battery cell 14. However, a type of the battery cell 14 is not limited thereto. For example, the battery cell 14 may be a prismatic battery cell 14.

The battery cell 14 may generally have a flat shape forming four edges or sides. The four edges of the battery cell 14 may form a perimeter of the battery cell 14.

The exterior material 15 may include a sealing portion 15a in which a sealing is performed, and a non-sealing portion 15b in which the sealing is not performed. A plurality of sealing portions 15a may be provided. The plurality of sealing portions 15a may be formed at three edges of the four edges of the battery cell 14, and the non-sealing portion 15b may be formed at one remaining edge. The plurality of sealing portions 15a may be sequentially connected to each other.

The sealing portion 15a may indicate a portion where two exterior materials 15 are coupled or attached while facing each other among the edges of the battery cell 14. The non-sealing portion 15b may indicate a portion formed of one exterior material 15 among the edges of the battery cell 14.

The electrode tab 16 may be formed or positioned at both opposite sides of the sealing portion 15a. For example, the plurality of electrode tabs 16 may be provided. For example, the electrode tab 16 may include a first electrode tab 16 and a second electrode tab 16. The electrode tab 16 may indicate at least one of the first electrode tab 16 and the second electrode tab 16. The first electrode tab 16 may be formed or positioned at the first sealing portion 15a among the plurality of sealing portions 15a. The second electrode tab 16 may be formed or positioned at the second sealing portion 15a among the plurality of sealing portions 15a. The first electrode tab 16 and the second electrode tab 16 may be positioned opposite to each other. The first sealing portion 15a and the second sealing portion 15a may be positioned opposite to each other.

The non-sealing portion 15b of the exterior material 15 may be in close contact with the electrode assembly of the battery cell 14. The non-sealing portion 15b may be referred to as a "close contact portion". The non-sealing portion 15b may form a shape extending in a longitudinal direction of the battery cell 14. An end of the non-sealing portion 15b may be connected to the first sealing portion 15a, and another end of the non-sealing portion 15b may be connected to the second sealing portion 15a.

The plurality of battery cells 14 may be provided. For example, the plurality of battery cells 14 may be stacked to form one battery group 10. The battery group 10 may be referred to as a "battery assembly". The plurality of battery groups 10 may be provided. The plurality of battery groups 10 may be disposed parallel to each other. The plurality of battery groups 10 may be spaced apart from each other. The plurality of battery cells 14 may be stacked in an up-down direction.

The plurality of battery groups 10 may include, for example, first and second battery groups 11 and 12. The first and second battery groups 11 and 12 may be divided by a center frame 62. In this embodiment, the battery module 1 is illustrated and described as including a pair of battery groups 10, but this embodiment is not limited thereto.

The battery module 1 may include a bus bar assembly 20. The bus bar assembly 20 may face one face of the battery group 10. For example, the bus bar assembly 20 may face a front face of the battery group 10. For example, the bus bar assembly 20 may be connected to the electrode tabs 16 of the battery group 10. The electrode tabs 16 of the battery group 10 may form a shape protruding from the front face of the battery group 10. The bus bar assembly 20 may face the electrode tabs 16 of the battery group 10.

The plurality of bus bar assemblies 20 may be provided. For example, the plurality of bus bar assemblies 20 may include a first bus bar assembly 21 and a second bus bar assembly 22. The first bus bar assembly 21 may be disposed on one side of the first battery group 11, and the second bus bar assembly 22 may be disposed on one side of the second battery group 12. The first bus bar assembly 21 and the second bus bar assembly 22 may be positioned in front of the battery group 10. The first bus bar assembly 21 and the second bus bar assembly 22, for example, may be positioned in front of the battery group 10. The first bus bar assembly 21 and the second bus bar assembly 22 may be disposed side by side. The first bus bar assembly 21 and the second bus bar assembly 22, for example, may be disposed parallel to each other.

The bus bar assembly 20 may include bus bars 31 and 32 and bus bar plates 41 and 42. For example, the first bus bar assembly 21 may include a first bus bar 31 and a first bus bar plate 41. For example, the second bus bar assembly 22 may include a second bus bar 32 and a second bus bar plate 42. The bus bars 31 and 32 may indicate at least one of the first bus bar 31 and the second bus bar 32. The bus bar plates 41 and 42 may indicate at least one of the first bus bar plate 41 and the second bus bar plate 42.

The bus bars 31 and 32 may be configured to electrically connect the battery cells 14 of the battery group 10. The bus bars 31 and 32 may electrically connect the electrode tabs 16 of the plurality of battery cells 14. For example, the bus bars 31 and 32 may be connected to the first electrode tabs 16 of the plurality of battery cells 14.

The bus bars 31 and 32 may be seated or fixed to the bus bar plates 41 and 42. The bus bar plates 41 and 42 may at least partially cover one face of the battery group 10, from which the electrode tabs 16 of the battery group 10 protrude, among the faces of the battery group 10. For example, the bus bar plates 41 and 42 may cover at least a portion of a front face of the battery group 10. The bus bar plates 41 and 42 may be formed of a material containing a resin.

The bus bar plates 41 and 42 may include mounting portions 51 and 52. The mounting portions 51 and 52 may refer to portions of the bus bar plates 41 and 42 on which the bus bars 31 and 32 are not mounted. The mounting portions 51 and 52 may include a first mounting portion 51 and a second mounting portion 52. The mounting portions 51 and 52 may indicate at least one of the first mounting portion 51 and the second mounting portion 52.

The mounting portions 51 and 52 may be adjacent to the bus bars 31 and 32. For example, the first mounting portion 51 may be adjacent to the first bus bar 31. For example, the second mounting portion 52 may be adjacent to the second bus bar 32. The first and second mounting portions 51 and 52 may be disposed adjacent to each other.

The battery module 1 may include a module housing 60 accommodating the battery group 10. For example, the module housing 60 may accommodate the plurality of battery groups 10. For example, the module housing 60 may accommodate the first battery group 11 and the second battery group 12. The module housing 60 may include the center frame 62. The center frame 62 may be disposed between the first battery group 11 and the second battery group 12. The center frame 62 may include a partition portion 64 and upper and lower frames 65 and 66. The upper and lower frames 65 and 66 may indicate at least one of the upper frame 65 and the lower frame 66.

The partition portion 64 may partition the plurality of battery groups 10. For example, the partition portion 64 may be positioned between the first battery group 11 and the second battery group 12. The partition portion 64 may face a stack face 11a of the battery group 10. The partition portion 64 may face a stack face (not shown) of the second battery group 12.

The partition portion 64 may directly contact the stack faces of the battery group 10. As another example, the partition portion 64 may contact the stack faces of the battery group 10 through a heat transfer member (not shown). In other words, the heat transfer member (not shown) may be positioned between the battery group 10 and the partition portion 64.

The stack face of the battery group 10 may refer to a face on which the non-sealing portions 15b of the battery cells 14 are stacked. That is, the non-sealing portions 15b of the battery cells 14 may face the partition portion 64. For example, the non-sealing portions 15b of the battery cells 14 may be in contact with the partition portion 64. The partition portion 64 may partition the battery groups 10 to function as a partition. The partition portion 64 may be a heat exchanger through which a refrigerant flows. The partition portion 64 can effectively absorb heat radiated from the battery group 10.

The upper frame 65 and the lower frame 66 may be connected to the partition portion 64 to cover the upper part and the lower part of the plurality of battery groups 10, respectively. The partition portion 64, the upper frame 65, and the lower frame 66 may form an 'I'-shape as a whole. The plurality of battery cells 14 may be stacked between the upper frame 65 and the lower frame 66.

For example, the plurality of battery cells 14 may be stacked in a direction from the lower frame 66 toward the upper frame 65. In other words, the lower frame 66, each of the plurality of battery cells 14, and the upper frame 65 may be sequentially disposed.

For another example, the plurality of battery cells 14 may be stacked in a direction from the partition portion 64 toward the side frame 70. For example, the partition portion 64, each of the plurality of battery cells 14, and the side frame 70 may be sequentially disposed.

The upper and lower frames 65 and 66 may be integrally formed with the partition portion 64. An accommodation space 67 in which the battery groups 10 can be disposed may be formed between the upper frame 65 and the lower frame 66. The accommodation space 67 may be partitioned by the partition portion 64.

The upper frame 65 may be connected to an upper edge of the partition portion 64. For example, the upper frame 65 may form a shape extending from the upper edge of the partition portion 64. The upper frame 65 may extend from a front end of the upper edge of the partition portion 64 and lead to a rear end of the upper edge.

The lower frame 66 may be connected to a lower edge of the partition portion 64. For example, the lower frame 66 may form a shape extending from the lower edge of the partition portion 64. The lower frame 66 may extend from a front end of the lower edge of the partition portion 64 and lead to a rear end of the lower edge. The lower frame 66 may be parallel to the upper frame 65.

The side frame 70 may be configured to cover both sides of the plurality of battery groups 10. For example, the side frame 70 may cover the opposite face of the stack face facing the partition portion 64 among the faces of the battery group 10. For example, the plurality of side frames 70 may be provided. For example, the first battery group 11 may be positioned between the first side frame 70 and the partition portion 64. For example, the second battery group 12 may be positioned between the second side frame 70 and the partition portion 64.

The module housing 60 may include a front frame 72 and a rear frame 74. The front and rear frames 72 and 74 may cover the front and rear faces of the plurality of battery groups 10. For example, the front frame 72 may cover the front faces of the battery group 10. For example, the rear frame 74 may cover the rear faces of the battery group 10.

The bus bar assemblies 20 may be disposed on the front and rear faces of the plurality of battery groups 10. For example, the first bus bar assembly 21 and the second bus bar assembly 22 may be disposed on the first side of the battery groups 10. For example, the first bus bar assembly 21 and the second bus bar assembly 22 may be disposed in front of the battery groups 10. For example, a third bus bar assembly 23 and a fourth bus bar assembly 24 may be disposed behind the battery groups 10. For example, the third bus bar assembly 23 and the fourth bus bar assembly 24 may be disposed on the second side of the battery groups 10. The front and rear frames 72 and 74 may cover the bus bar assemblies 20. For example, the front frame 72 may cover the first bus bar assembly 21 and the second bus bar assembly 22. For example, the rear frame 74 may cover the third bus bar assembly 23 and the fourth bus bar assembly 24.

The front and rear frames 72 and 74 may include the front frame 72 and the rear frame 74. The front frame 72 may be disposed in front of the center frame 62, and the rear frame 74 may be disposed in the rear of the center frame 62.

The front frame 72 may include an exposure hole 76. For example, the exposure hole 76 may be a hole formed in the front frame 72. A connector 83 of a sensing unit 80 may be exposed to the outside through the exposure hole 76. For example, the connector 83 of the sensing unit 80 may be connected to the outside through the exposure hole 76. That is, the sensing unit 80 may be electrically connected to an external device of the battery module 1.

Figure 4:
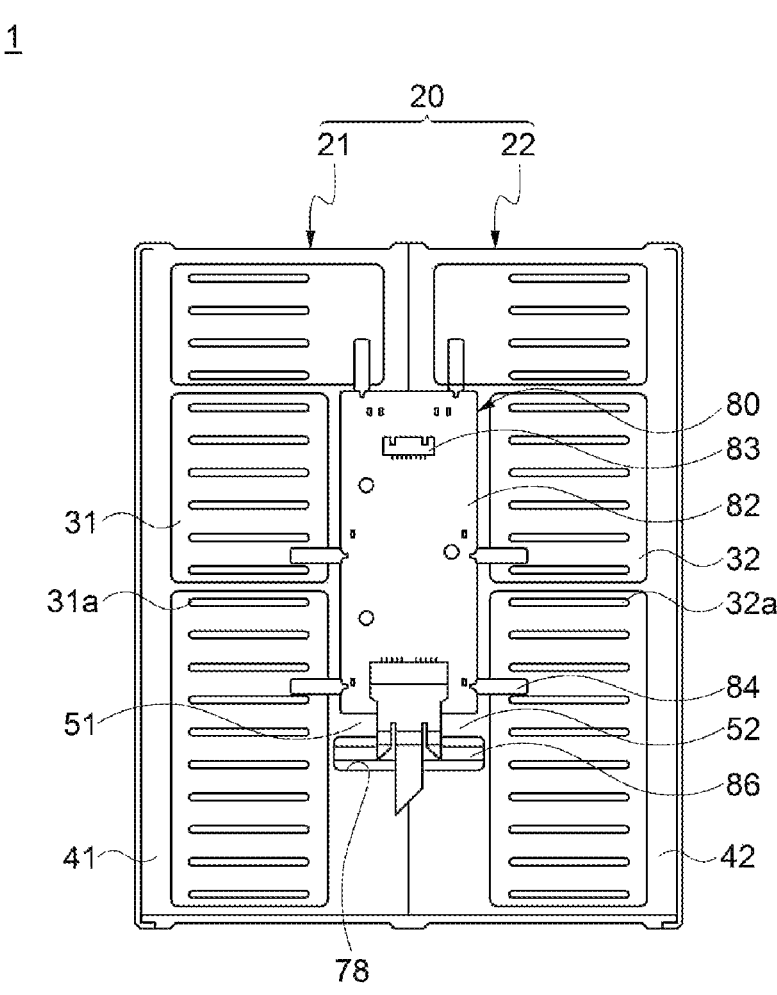
FIG. 4 illustrates an arrangement of a sensing unit in a battery module according to an embodiment of the present disclosure.

FIG. 4 illustrates an arrangement of a sensing unit in a battery module according to an embodiment of the present disclosure. The arrangement of the sensing unit is described with reference to FIGS. 1 to 3 as well as FIG. 4.

The battery module 1 may include the sensing unit 80.

The sensing unit 80 may be disposed between the upper frame 65 and the lower frame 66.

The sensing unit 80 may sense a state of the plurality of battery cells 14. The state of the battery cells 14 sensed by the sensing unit 80 may include a voltage of the battery cells 14 and a temperature of the battery cells 14.

The sensing unit 80 may be connected to the battery cells 14 through the bus bars 21 and 22 of the bus bar assembly 20. However, the present disclosure is not limited thereto, and the sensing unit 80 may be directly connected to the battery cells 14.

As illustrated in FIGS. 3 and 4, the sensing unit 80 may be disposed on outer faces of one sides of the pair of battery groups 10. For example, the sensing unit 80 may be positioned in front of the battery group 10. For example, at least a portion of the sensing unit 80 may be positioned behind the front frame 72. The pair of battery groups 10 may include the first battery group 11 and the second battery group 12.

The sensing unit 80 may sense the state of the battery cells 14 of the pair of battery groups 10. That is, all the states of the battery cells 14 included in the pair of battery groups 10 may be sensed by one sensing unit 80.

The sensing unit 80 may be mounted on the bus bar plates 41 and 42. The sensing unit 80 may be mounted on the mounting portions 51 and 52 of the bus bar plates 41 and 42. For example, a part of the sensing unit 80 may be coupled to the first mounting portion 51 of the first bus bar plate 41, and another part of the sensing unit 80 may be coupled to the second mounting portion 52 of the second bus bar plate 42.

The sensing unit 80 may be disposed to correspond to the mounting portions 51 and 52 of the bus bar plates 41 and 42. For example, the sensing unit 80 may be symmetrically disposed with respect to a boundary between the first mounting portion 51 and the second mounting portion 52. That is, a part of the sensing unit 80 disposed on the first mounting portion 51 may be symmetrical with a part of the sensing unit 800 disposed on the second mounting portion 52.

The sensing unit 80 may be disposed in front of the partition portion 64 of the module housing 60. The sensing unit 80 may be supported by the partition portion 64. Through this, the sensing unit 80 may be stably supported by the center frame 62 or the bus bar assemblies 21 and 22.

The sensing unit 80 may include a circuit board 82 mounted on the bus bar assembly 20. The circuit board 82 may include a circuit for sensing the state of the battery cells 14. For example, the circuit board 82 may be coupled to the bus bar plates 41 and 42. For example, a part of the circuit board 82 may be coupled to the first mounting portion 51, and another part of the circuit board 82 may be coupled to the second mounting portion 52.

The sensing unit 80 may include a connector 83. The connector 83 may receive information about the states of the plurality of battery cells 14 from the circuit board 82. The connector 83 may be disposed on the circuit board 82. For example, the connector 83 may be coupled or electrically connected to the circuit board 82.

Signals or information transmitted to the connector 83 may be transmitted to the outside of the battery module 1. For example, an external device may be connected to the connector 83 through the exposure hole 76 and may receive signals or information from the connector 83. The connector 83 may face the exposure hole 76. The connector 83 can be observed from the front of the front frame 72 through the exposure hole 76.

The sensing unit 80 may include a connection unit 84. A plurality of connection units 84 may be provided. The plurality of connection units 84 may be connected to the circuit board 82. The connection unit 84 may form a leg shape. The plurality of connection units 84 may be electrically connected to the bus bars 31 and 32.

The plurality of connection units 84 may be respectively connected to the bus bars 31 and 32 to obtain information or signals about the states of the battery cells 14. The information or signals obtained from the connection units 84 may be transmitted to the circuit board 82.

The battery module 1 may include an auxiliary sensing unit 90. The auxiliary sensing unit 90 may be disposed on outer faces of other sides of the pair of battery groups 10. That is, the sensing unit 80 may be disposed on one sides of the pair of battery groups 10, and the auxiliary sensing unit 90 may be disposed on other sides of the pair of battery groups 10. In other words, the sensing unit 80 may be positioned in front of the pair of battery groups 10, and the auxiliary sensing unit 90 may be positioned behind the pair of battery groups 10. The sensing unit 80 may be referred to as a "first sensing unit" or a "main sensing unit". The auxiliary sensing unit 90 may be referred to as a "second sensing unit".

The sensing unit 80 may obtain information about the states of the battery cells 14 from one sides of the battery cells 14 included in the pair of battery groups 10. The auxiliary sensing unit 90 may obtain information about the states of the battery cells 14 from the other sides of the battery cells 14.

The bus bar assembly 20 may include the third and fourth bus bar assemblies 23 and 24 disposed on opposite faces of the first and second bus bar assemblies 21 and 22 with respect to the battery groups 10. The third and fourth bus bar assemblies 23 and 24 may include third and fourth bus bars (not shown) and third and fourth bus bar plates (not shown), respectively. The third and fourth bus bars and the third and fourth bus bar plates may correspond to the first and second bus bars 31 and 32 and the first and second bus bar plates 41 and 42, respectively.

The configuration of the third bus bar may be the same as the configuration of the first bus bar 31, and the configuration of the fourth bus bar may be the same as the configuration of the second bus bar 32. The configuration of the third bus bar plate may be the same as the configuration of the first bus bar plate 41, and the configuration of the fourth bus bar plate may be the same as the configuration of the second bus bar plate 42.

For example, the third bus bar and the fourth bus bar may be connected to the electrode tabs 16 of the battery groups 10. For example, the third bus bar and the fourth bus bar may be connected to the second electrode tabs 16 of the battery groups 10. For example, the third bus bar and the fourth bus bar may electrically connect the second electrode tabs 16 of the battery groups 10.

The auxiliary sensing unit 90 may be coupled to the third bus bar assembly 23 and the fourth bus bar assembly 24. For example, the auxiliary sensing unit 90 may be coupled or mounted to the bus bar plate of the third bus bar assembly 23 and the bus bar plate of the fourth bus bar assembly 24.

For example, a part of the auxiliary sensing unit 90 may be mounted or coupled to a third mounting portion of the third bus bar plate of the third bus bar assembly 23. For example, another part of the auxiliary sensing unit 90 may be mounted or coupled to a fourth mounting portion of the fourth bus bar plate of the fourth bus bar assembly 24. The configuration of the third mounting portion may be the same as the configuration of the first mounting portion 51. The configuration of the fourth mounting portion may be the same as the configuration of the second mounting portion 52.

The battery module 1 may include a connection line 86 connecting the sensing unit 80 to the auxiliary sensing unit 90. The information or signals obtained from the auxiliary sensing unit 90 may be transmitted to the sensing unit 80 through the connection line 86, and the information or signals transmitted to the sensing unit 80 may be transmitted to a battery management system (BMS), etc. outside the battery module 1 through the connector 83. The connection line 86 may include an FPCB.

The connection line 86 may pass between the partition portion 64 and the battery group 10. For example, the connection line 86 may be disposed between one of the first and second battery groups 11 and 12 and the partition portion 64. One end of the connection line 86 may be connected to the sensing unit 80, and other end of the connection line 86 may be connected to the auxiliary sensing unit 90. Through this configuration, an external exposure of the connection line 86 can be prevented, and the connection line 86 can be prevented from being damaged by external factors.

At least one of the first and second bus bar plates 41 and 42 may include a through hole 78 so that the end of the connection line 86 is connected to the sensing unit 80 or the auxiliary sensing unit 90. One end of the connection line 86 may pass through the through hole 78 formed in at least one of the first and second bus bar plates 41 and 42 and may be connected to the sensing unit 80. The other end of the connection line 86 may pass through a through hole formed in at least one of the third and fourth bus bar plates and may be connected to the auxiliary sensing unit 90.

The assembly of the battery module according to the above configurations is described below.

The bus bar assembly 20 may be mounted or coupled to the plurality of battery groups 10. The plurality of battery groups 10 coupled to the bus bar assembly 20 may be respectively disposed in the accommodation spaces 67 of the center frame 62.

The sensing unit 80 may be mounted or coupled to at least one of the first mounting portion 51 and the second mounting portion 52. The auxiliary sensing unit 90 may be mounted or coupled to at least one of the third bus bar assembly 23 and the fourth bus bar assembly 24.

The sensing unit 80 may obtain information or signals about the states of the battery cells 14 from the first and second bus bar assemblies 21 and 22 connected to the front ends of the battery groups 10. The auxiliary sensing unit 90 may obtain information or signals about the states of the battery cells 14 from the third and fourth bus bar assemblies 23 and 24 connected to the rear ends of the battery groups 10. In addition, the information or signals sensed by the auxiliary sensing unit 90 may be transmitted to the sensing unit 80 through the connection line 86.

Through this, the configuration of the sensing unit 80 and/or the auxiliary sensing unit 90 can be simplified, and the battery module 1 can be configured more compactly. In addition, since the sensing unit 80 and the auxiliary sensing unit 90 can be disposed inside the module housing 60, a separate case is not necessary to accommodate the sensing unit 80 and the auxiliary sensing unit 90. Hence, it is possible to maximize the space utilization of the battery module. In addition, since information on the battery cells of the plurality of battery groups can be sensed by one sensing unit 80, the space of the battery module can be efficiently used.

Some embodiments or other embodiments of the present disclosure described above are not mutually exclusive or distinct from each other. Configurations or functions of some embodiments or other embodiments of the present disclosure described above can be used together or combined with each other.

It is apparent to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

The invention claimed is:

1. A battery module comprising:
   a module case;
   first and second battery groups disposed inside the module case to be spaced apart from each other, each of the first and second battery groups including a plurality of battery cells;
   a first bus bar assembly comprising a first bus bar plate disposed on a first side of the first battery group, and a first bus bar disposed on the first bus bar plate configured to electrically connect the plurality of battery cells of the first battery group;

a second bus bar assembly comprising a second bus bar plate disposed on a first side of the second battery group, and a second bus bar disposed on the second bus bar plate configured to electrically connect the plurality of battery cells of the second battery group; and a sensing unit electrically connected to both the first bus bar and the second bus bar, the sensing unit sensing states of the plurality of battery cells, wherein the module case includes a partition portion disposed between the first battery group and the second battery group, wherein the first bus bar plate comprises a first mounting portion, and the second bus bar plate comprises a second mounting portion, wherein the second mounting portion and the first mounting portion are disposed adjacent to each other, wherein a portion of the sensing unit is disposed on the first mounting portion and another portion of the sensing unit is disposed on the second mounting portion, the sensing unit is disposed in front of the partition portion.

2. The battery module of claim 1, wherein the part of the sensing unit is symmetrical with the another part of the sensing unit.

3. The battery module of claim 1, wherein the sensing unit includes:

a circuit board disposed on the mounting portion; and a plurality of connection units extended from the circuit board and electrically connected to the first bus bar and the second bus bar.

4. The battery module of claim 1, wherein the module case includes:

a center frame configured to partition the first battery group and the second battery group;

a front frame disposed in a front of the center frame; and a rear frame disposed in a rear of the center frame.

5. The battery module of claim 4, wherein the sensing unit includes:

a circuit board disposed on the mounting portion; and a connector coupled to the circuit board and facing an exposure hole formed in the front frame.

6. The battery module of claim 4, wherein the center frame includes:

a partition portion disposed between the first battery group and the second battery group;

an upper frame connected to an upper edge of the partition portion; and a lower frame connected to a lower edge of the partition portion.

7. The battery module of claim 6, wherein the sensing unit is disposed between the upper frame and the lower frame.

8. The battery module of claim 6, further comprising:

a third bus bar assembly disposed on a second side of the first battery group, the third bus bar assembly including a third bus bar configured to electrically connect the plurality of battery cells of the first battery group;

a fourth bus bar assembly disposed on a second side of the second battery group, the fourth bus bar assembly including a fourth bus bar configured to electrically connect the plurality of battery cells of the second battery group;

an auxiliary sensing unit electrically connected to both the third bus bar and the fourth bus bar, the auxiliary sensing unit configured to sense the states of the plurality of battery cells; and a connection line passing between the partition portion and at least one of the first and second battery groups, the connection line configured to electrically connect the sensing unit to the auxiliary sensing unit.

9. The battery module of claim 8, wherein at least one of the first and second bus bar plates includes a through hole through which the connection line passes.

10. The battery module of claim 1, wherein each of the plurality of battery cells faces the partition portion and is connected to the partition portion.

11. The battery module of claim 10, further comprising a heat transfer member disposed between the partition portion and the first battery group and disposed between the partition portion and the second battery group.

12. The battery module of claim 10, wherein a perimeter of each of the plurality of battery cells includes:

sealing portions disposed at three edges of the perimeter, wherein both opposite exterior materials of the sealing portions contact each other; and a non-sealing portion disposed at one remaining edge of the perimeter and formed of a single exterior material, wherein the non-sealing portion faces the partition portion and is connected to the partition portion.

13. The battery module of claim 12, further comprising a heat transfer member disposed between the partition portion and the non-sealing portion.

14. The battery module of claim 12, wherein the partition portion is a heat exchanger through which a refrigerant flows, and the partition portion absorbs heat generated in the plurality of battery cells.

* * * * *